Figure 1:
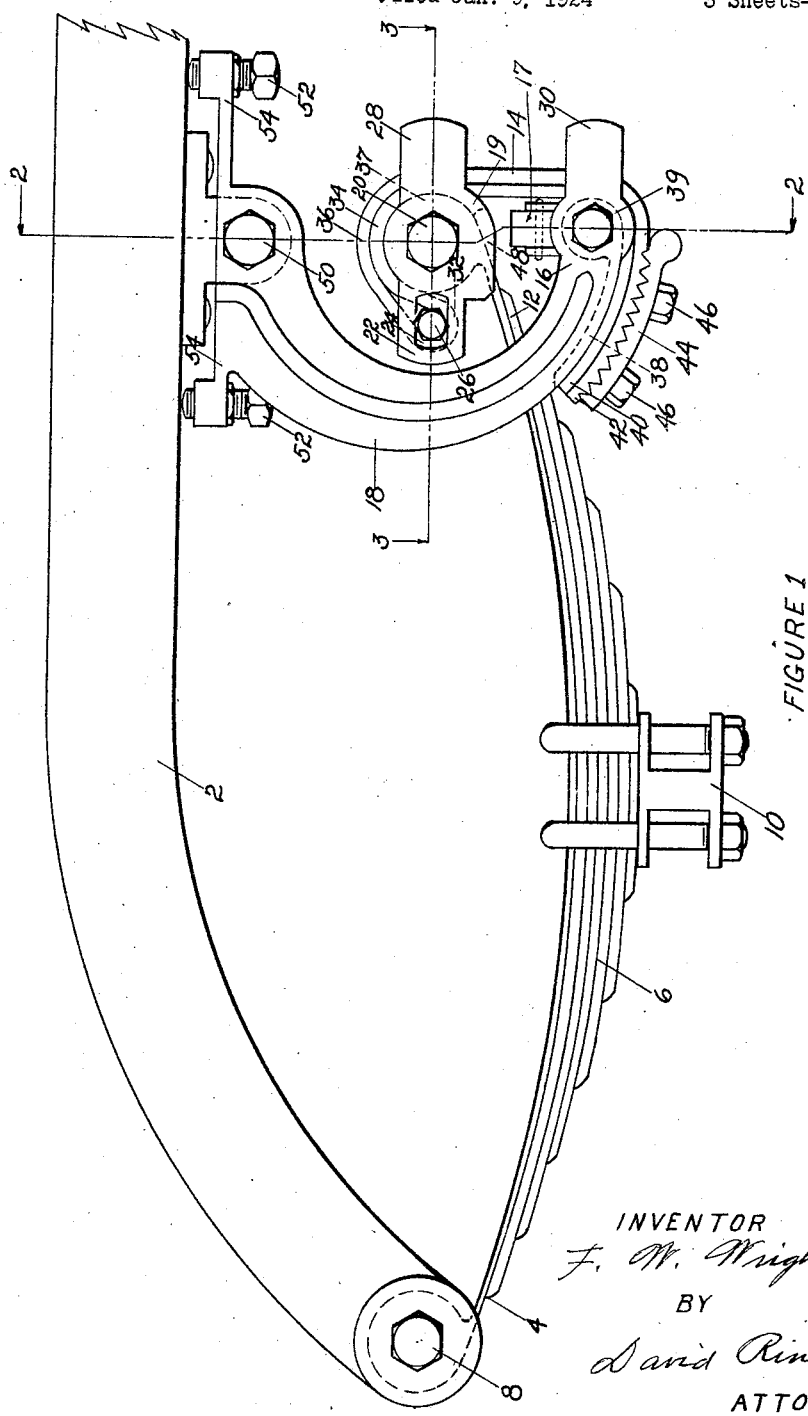

June 9, 1925.

F. W. WRIGHT 1,541,458

VEHICLE

Filed Jan. 9, 1924

3 Sheets-Sheet 1

INVENTOR
F. W. Wright
BY
David Rines
ATTORNEY.

June 9, 1925.  1,541,458
F. W. WRIGHT
VEHICLE
Filed Jan. 9, 1924     3 Sheets-Sheet 2
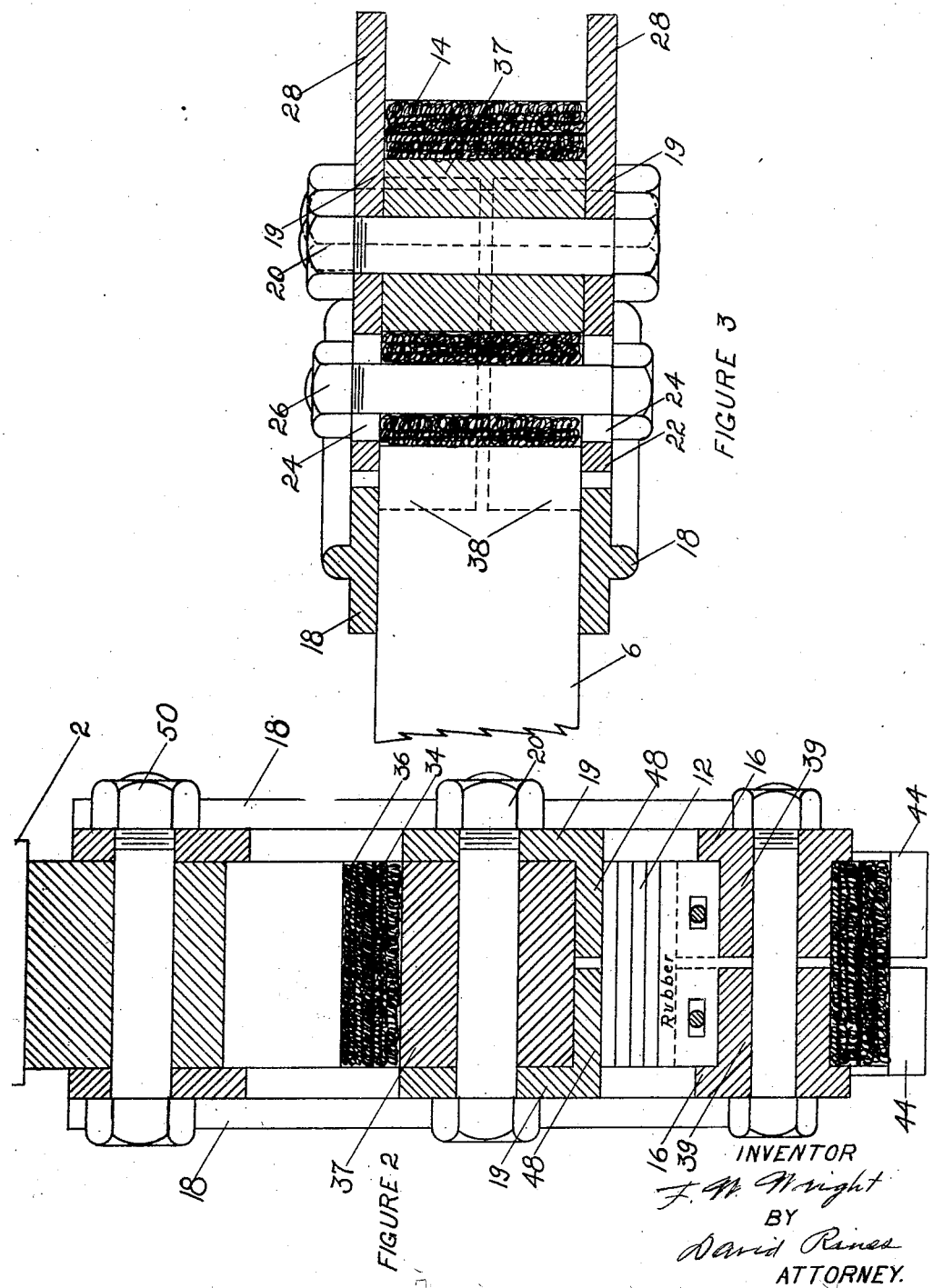

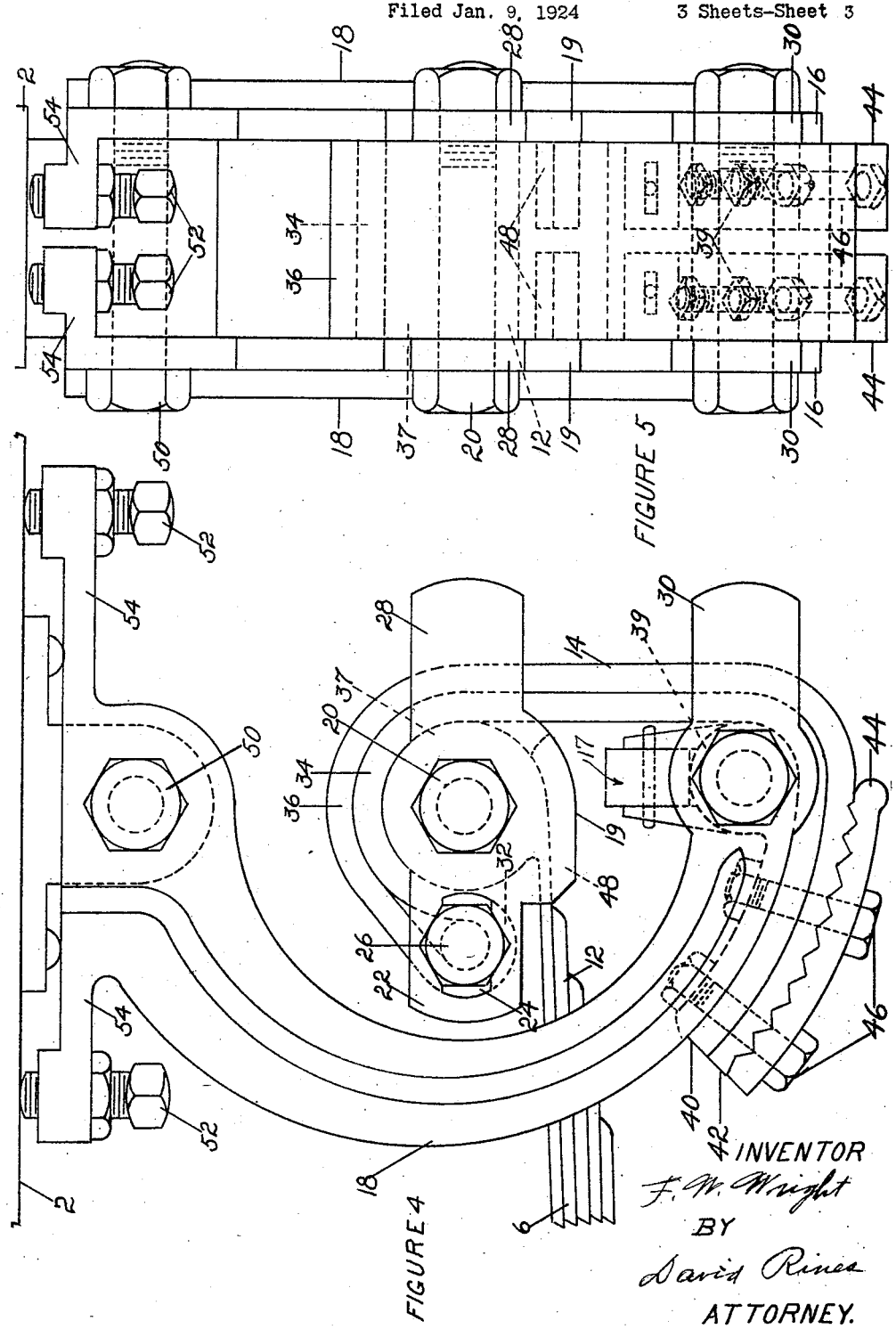

Patented June 9, 1925.

1,541,458

UNITED STATES PATENT OFFICE.

FREDERICK W. WRIGHT, OF DANVERS, MASSACHUSETTS.

VEHICLE.

Application filed January 9, 1924. Serial No. 685,214.

*To all whom it may concern:*

Be it known that I, FREDERICK W. WRIGHT, a citizen of the United States, and a resident of Danvers, in the county of Essex and Commonwealth of Massachusetts, have invented new and useful Improvements in Vehicles, of which the following is a specification.

The present invention relates to vehicles, and more particularly to vehicle suspensions.

The nature and the object of the invention will be readily understood from the following description, taken in connection with the accompanying drawings, in which Fig. 1 is an elevation of a portion of a vehicle, having the present invention embodied therein in its preferred form; Fig. 2 is a section taken upon the line 2—2 of Fig. 1, looking in the direction of the arrows, the section being upon a larger scale than Fig. 1; Fig. 3 is a similarly enlarged section taken upon the line 3—3 of Fig. 1; and Figs. 4 and 5 are similarly enlarged side and front views of a portion of the vehicle shown in Fig. 1.

The invention is illustrated as applied to an automobile the frame of which is indicated at 2. One end 4 of a conventional vehicle leaf spring 6 is shown pivoted to one end of the frame at 8. An intermediate portion of the spring is supported by a supporting axle 10. An upward force is therefore exerted by the weight of the vehicle upon the other end 12 of the vehicle spring 6. In order to take up this force, the said end 12 of the spring 8 is connected by a tape 14 to the lower ends 16 of two depending brackets 18. The brackets 18 are secured to the underside of the frame 2, and are of dimensions such that their lower ends 16 are disposed beneath the end 12 of the spring 6, the end 12 of the spring 6 entering between the brackets. The tape 14 may be constituted of any desired material suitable to withstand the forces to which it is subjected. Brake-band lining has been found to work well, in practice. Shocks that may be caused by the ends 12 of the springs 6 engaging the lower ends 16 of the brackets 18 may be taken up by elastic buffers 17.

According to the specific embodiment of the invention that is herein illustrated and described, two arms 19 are intermediately pivoted at 20 to the end 12 of the spring 6, one on each side of the spring. The ends 22 of the arms 19 are provided with elongated openings 24 in which a pin 26 is slidably mounted. The opposite ends of the arms are provided with extensions 28. The lower portions 16 of the brackets 18 are similarly provided with extensions 30. An intermediate portion 32 of the tape 14 extends around the pin 26. Portions 34 and 36 of the tape, on both sides of the intermediate portion 32, extend around a rounded end 37 of the end 12 of the spring 6, and over the other ends of the arms, between the extensions 28, then down between the extensions 30 of the brackets 18, around bosses 39 integral with the brackets 18, and around curved portions 38 of the lower portions 16 of the brackets 18. The ends 40 and 42 of the tape are clamped against the curved portions 38 by clamp jaws 44 that are held in place by bolts or the like 46.

The upward force exerted by the weight of the vehicle upon the end 12 of the spring 6 is thus transmitted to the bottom of the brackets 18 by the tape 14. The tape, in its turn, pulls against the pin 26, thereby tending to move the arms 19 about their pivot 20. The arms 19 are therefore provided with stops 48 that engage and seat against the spring 6 and resist pivotal movement of the arms 19. With the parts properly adjusted, the arms 28 act, in effect, as an integral part of the spring 6.

The brackets are pivotally adjustable about a bolt 50, and are adapted to be held in pivotally adjusted position by set screws or the like 52 mounted in arms 54 of the brackets 18. The set screws engage against the lower portions of the frame 2.

It will be understood that the invention is not restricted to the exact embodiment thereof that is herein illustrated and described, but may readily be modified by persons skilled in the art, and that such modifications are considered to fall within the spirit of the invention, the scope of which is defined in the appended claims.

What is claimed is:

1. In a vehicle having relatively movable elements, one of which is the frame of the vehicle, a support for the other element, a portion of the said other element being disposed above an adjacent portion of the frame, and a tape, an intermediate portion of which extends around one of the said element portions and having portions on both sides of the said intermediate portion secured to the other of the said element portions.

2. In a vehicle having relatively movable elements, an arm pivoted to one of the elements, a stop for limiting the pivotal movement of the arm, and a connecting element secured to the arm and to the other element, the connecting element being adapted to exert a force upon the arm in a direction such as to tend to maintain the arm in engagement with the stop, the construction and arrangement being such that the arm is normally maintained in engagement with the stop.

3. In a vehicle having relatively movable elements, an arm intermediately pivoted to one of the elements, a connecting element secured to the other element and to one of the ends of the arm and extending over the other end of the arm, whereby the connecting element is adapted to exert a force upon the arm tending to pivot the arm, and a stop for limiting the pivotal movement of the arm, the construction and arrangement being such that the arm is normally maintained in engagement with the stop.

4. In a vehicle having relatively movable elements, an arm intermediately pivoted to one of the elements, one end of the arm being provided with a pin, a tape an intermediate portion of which extends around the pin, portions of the tape on both sides of the intermediate portion extending over the other end of the arm and being secured to the other element, whereby the tape is adapted to exert a force upon the arm tending to pivot the arm, and a stop for limiting the pivotal movement of the arm.

5. In a vehicle, a frame, a support, a leaf spring intermediately supported upon the support, one end of the leaf spring being pivoted to the frame, the other end of the leaf spring being disposed above an adjacent portion of the frame, and a tape an intermediate portion of which extends around the said other end of the leaf spring and having portions on both sides of the intermediate portion secured to the said adjacent portion of the frame.

6. In a vehicle, a frame having a depending bracket, a support, a leaf spring intermediately supported upon the support, one end of the leaf spring being pivoted to the frame, the other end of the leaf spring being disposed above the lower portion of the bracket, and a tape an intermediate portion of which extends around the said other end of the leaf spring and having portions on both sides of the intermediate portion secured to the said lower portion of the bracket.

7. In a vehicle, a frame having a depending bracket, a support, a leaf spring intermediately supported upon the support, one end of the leaf spring being pivoted to the frame, the other end of the leaf spring being disposed above the lower portion of the bracket, an arm pivoted to the said other end of the leaf spring, a stop for limiting the pivotal movement of the arm, and a connecting element secured to the said lower portion of the bracket and to the arm, the connecting element being adapted to exert a force upon the arm in a direction such as to tend to maintain the arm in engagement with the stop.

8. In a vehicle, a frame having a depending bracket, a support, a leaf spring intermediately supported upon the support, one end of the leaf spring being pivoted to the frame, the other end of the leaf spring being disposed above the lower portion of the bracket, an arm intermediately pivoted to the said other end of the leaf spring, a connecting element secured to the said lower portion of the bracket and to one of the ends of the arm and extending over the other end of the arm, whereby the connecting element is adapted to exert a force upon the arm tending to pivot the arm, and a stop for limiting the pivotal movement of the arm.

9. In a vehicle, a frame having a depending bracket, a support, a leaf spring intermediately supported upon the support, one end of the leaf spring being pivoted to the frame, the other end of the leaf spring being disposed above the lower portion of the bracket, an arm intermediately pivoted to the said other end of the leaf spring, one end of the arm having a pin, a tape an intermediate portion of which extends around the pin, portions of the tape on both sides of the intermediate portion extending over the other end of the arm and being secured to the lower portion of the bracket, whereby the tape is adapted to exert a force upon the arm tending to pivot the arm, and a stop for limiting the pivotal movement of the arm.

10. In a vehicle having relatively movable elements one of which is the frame of the vehicle, and the other a spring, a support for the spring, a portion of the spring being disposed above an adjacent portion of the frame, and a tape an intermediate portion of which extends around one of the said element portions and having portions on both sides of the said intermediate portion secured to the other of the said element portions.

11. In a vehicle having relatively movable elements one of which is the frame of the vehicle, a support for the other element, a portion of the said other element being disposed above an adjacent portion of the frame, an arm pivoted to one of the said adjacent portions, a stop for limiting the pivotal movement of the arm, and a connecting element secured to the said adjacent portion of the frame and to the arm, the connecting element being adapted to exert a force upon the arm in a direction such as to tend to maintain the arm in engagement with the stop.

In testimony whereof I have hereunto subscribed my name this 29th day of December, 1923.

FREDERICK W. WRIGHT.